J. W. COMBS.
COMBINED AUTOMOBILE PULLER AND BRAKE DRUM.
APPLICATION FILED AUG. 9, 1916.
1,208,489.
Patented Dec. 12, 1916.
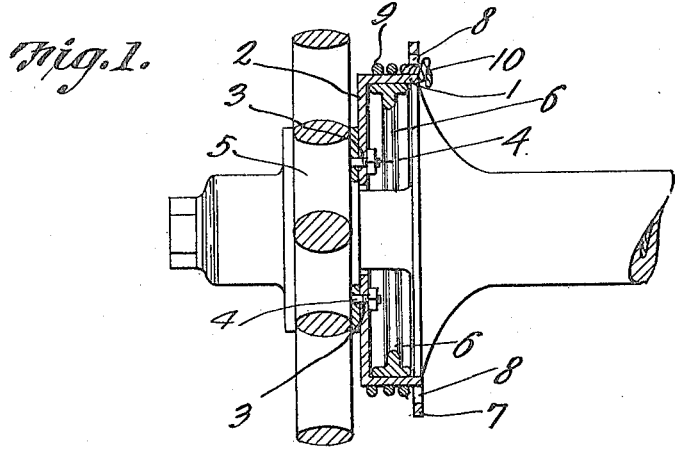
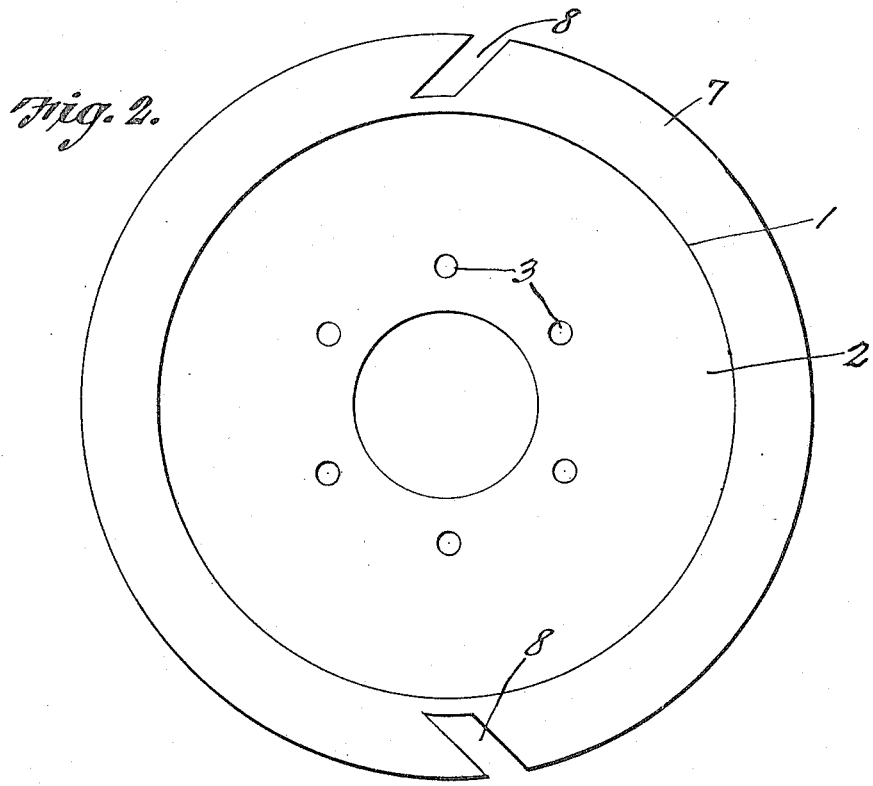
Witnesses
J. W. Combs  Inventor
by  Attorneys

UNITED STATES PATENT OFFICE.

JOHN W. COMBS, OF MARIONVILLE, MISSOURI.

COMBINED AUTOMOBILE PULLER AND BRAKE-DRUM.

1,208,489.     Specification of Letters Patent.     Patented Dec. 12, 1916.

Application filed August 9, 1916. Serial No. 114,053.

*To all whom it may concern:*

Be it known that I, JOHN W. COMBS, a citizen of the United States, residing at Marionville, in the county of Lawrence and State of Missouri, have invented a new and useful Combined Automobile Puller and Brake-Drum, of which the following is a specification.

The present invention aims to provide an especially constructed brake drum for automobiles which will also serve in a thoroughly convenient and efficient manner as a device for extricating or pulling the automobile out of a mud hole or rut in which it is stuck.

The object of the invention is to provide an extremely simple, compact and inexpensive device combining an automobile brake drum and puller, and which is adapted to replace an ordinary brake drum, whereby the device can be readily applied to an automobile.

With the foregoing and other objects in view which will appear as the description proceeds, the invention resides in the combination and arrangement of parts and in the details of construction hereinafter described and claimed, it being understood that changes in the precise embodiment of the invention herein described can be made within the scope of what is claimed without departing from the spirit of the invention.

The invention is illustrated in the accompanying drawings, wherein:—Figure 1 is a sectional view of the device as applied; Fig. 2 is an enlarged plan view of the device.

In carrying out the invention, there is provided a cylindrical drum 1 cast, forged or otherwise formed from suitable metal, and provided at one edge with an inturned annular flange 2 provided with apertures 3 for the reception of the bolts 4 of the rear wheel 5 of an automobile, whereby the present can be applied in lieu of the ordinary brake drum which has been removed. As illustrated, the device is designed for application to a Ford automobile, but it is evident that the device can be adapted for use upon various motor vehicles with the same facility and success. The brake shoes 6 are disposed within the drum 1 to frictionally engage the inner surface thereof, thereby to provide the braking action as usual, so that the drum serves the function of an ordinary brake drum, but it is desirable to have the drum 1 somewhat wider than the ordinary drum. That edge of the drum 1 remote from the flange 2 is provided with an outstanding flange 7 provided at opposite points with reverse oblique slots 8.

Should the automobile become stuck in a mud-hole or rut, instead of pulling the car from the mud hole or rut by a team of draft animals or other cumbersome operation, a rope or other flexible element 9 is anchored to the road, a tree, or other object ahead of the machine, and the rear end thereof is slipped in one slot 8 and provided with a knot or knob 10 lying against the outer face of the flange 7 to prevent the withdrawal of the rope from the slot 8, whereby to attach the rope to the drum. Then, by starting the engine so as to rotate the rear wheel and drum, the rope will be wound upon the drum, and this naturally will move the drum forward thereby compelling the car to move forward and thereby extricating the automobile from the rut in a thoroughly convenient and advantageous manner. The rope can be readily applied and removed, and the present drum is not conspicuous or objectionable, but nevertheless serves its purpose in a highly satisfactory manner.

One of the devices can be used for each of the rear wheels, if desired, in connection with two ropes or flexible objects. The devices are used on the inner sides of the wheels as usual.

Having thus described the invention, what is claimed as new is:—

1. In a device of the character described, a brake drum having an inturned flange at one edge for attachment to the rear wheel of an automobile, and having an out-turned flange at its other edge, said out-turned flange having means for the attachment of a flexible element to be wound upon the drum.

2. A device of the character described, embodying a brake drum having an inturned flange at one edge attachable to the rear wheel of an automobile and having an out-turned flange at its other edge, said out-turned flange having a slot for the engagement of the end of a flexible element adapted to be wound upon the drum.

3. A device of the character described, embodying a brake drum having an inturned flange at one edge attachable to the rear wheel of an automobile and having an outturned flange at its other edge, said outturned flange having reverse oblique slots for receiving the end of a flexible element adapted to be wound upon the drum.

In testimony that I claim the foregoing as my own, I have hereto affixed my signature in the presence of two witnesses.

JOHN W. COMBS.

Witnesses:
 JAS. A. BARKS,
 KATHERINE BUSCH.

Copies of this patent may be obtained for five cents each, by addressing the "Commissioner of Patents, Washington, D. C."